United States Patent
Rule-Greet et al.

(10) Patent No.: US 9,160,127 B2
(45) Date of Patent: Oct. 13, 2015

(54) INSERT FOR BATTERY ELECTRIC VEHICLE (BEV) SERVICE DISCONNECT

(71) Applicants: George E. Rule-Greet, Rochester, MI (US); Scott D. Bergin, Clarkston, MI (US)

(72) Inventors: George E. Rule-Greet, Rochester, MI (US); Scott D. Bergin, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 311 days.

(21) Appl. No.: 13/729,151

(22) Filed: Dec. 28, 2012

(65) Prior Publication Data

US 2014/0187071 A1    Jul. 3, 2014

(51) Int. Cl.
| | |
|---|---|
| *H01R 13/44* | (2006.01) |
| *H01R 33/97* | (2006.01) |
| *H01R 13/639* | (2006.01) |
| *H01R 13/447* | (2006.01) |
| *B60L 11/18* | (2006.01) |
| *H01R 33/95* | (2006.01) |

(52) U.S. Cl.
CPC ............... *H01R 33/97* (2013.01); *B60L 11/18* (2013.01); *H01R 13/447* (2013.01); *H01R 13/639* (2013.01); *H01R 33/95* (2013.01)

(58) Field of Classification Search
CPC ............................. H01R 13/639; H01R 13/447
USPC ........................ 439/133, 134, 148, 149, 150
See application file for complete search history.

(56) References Cited

U.S. PATENT DOCUMENTS

| | | | |
|---|---|---|---|
| 4,505,530 A * | 3/1985 | Fennel ........................... | 439/148 |
| 5,190,466 A * | 3/1993 | McVey ........................... | 439/133 |
| 5,340,324 A * | 8/1994 | Fields et al. ................... | 439/133 |
| 6,727,797 B1 | 4/2004 | Bruchmann | |
| 7,083,438 B2 * | 8/2006 | Massaro et al. ............... | 439/133 |
| 7,679,211 B2 | 3/2010 | Tabatowski-Bush et al. | |
| 2006/0228919 A1 | 10/2006 | Marukawa et al. | |

* cited by examiner

Primary Examiner — Felix O Figueroa
(74) Attorney, Agent, or Firm — Ralph E. Smith (57) ABSTRACT

A service disconnect assembly for an electric system is provided and may include a service disconnect base electrically connected to the electric system and a service disconnect plug connected to the service disconnect base in a connected state to supply the electric system with power via the service disconnect plug and disconnected from the service disconnect base in a disconnected state to prevent the supply of power to the electric system. The service disconnect assembly may additionally include a lockout plug connected to the service disconnect base when the service disconnect plug is in the disconnected state to prevent the service disconnect plug from inadvertently being moved into the connected state.

19 Claims, 6 Drawing Sheets

_Fig-1_

_Fig-2_

_Fig-3_

INSERT FOR BATTERY ELECTRIC VEHICLE (BEV) SERVICE DISCONNECT

FIELD

The present disclosure relates a service disconnect assembly for an electric system and more particularly to a service disconnect assembly having a lockout plug that prevents inadvertent use of the electric system during service.

BACKGROUND

Service disconnect assemblies are used in conjunction with electric systems such as electric and hybrid electric vehicles to selectively disconnect a power supply from an electric motor and other systems of the vehicle. Such service disconnect assemblies permit a service technician or other personnel to work on and service the vehicle without being exposed to current from the power supply.

Conventional service disconnect assemblies typically include a service disconnect base that is electrically connected to a power supply at a first terminal and is electrically connected to a load (i.e., an electric motor and other vehicle subsystems) at a second terminal. A service disconnect plug is received by a housing of the service disconnect base and typically includes a fuse that permits current to flow from the power supply to the electric motor and other vehicle subsystems when the service disconnect plug is properly connected to the service disconnect base.

The service disconnect plug may be removed from the service disconnect base when the vehicle requires service. When the service disconnect plug is removed, current is not permitted to flow from the first terminal to the second terminal and, as a result, is not permitted to power the electric motor and other vehicle subsystems. The electric motor and vehicle subsystems may now be serviced without concern that any of the components are energized by the power source.

While conventional service disconnect plugs adequately prevent power from being supplied to an electric motor and other subsystems of an electric or hybrid electric vehicle during service, such service disconnect plugs do not typically include a lockout mechanism that prevents the plug from being inadvertently connected to the service disconnect base.

SUMMARY

A service disconnect assembly for an electric system is provided and may include a service disconnect base electrically connected to the electric system and a service disconnect plug connected to the service disconnect base in a connected state to supply the electric system with power via the service disconnect plug and disconnected from the service disconnect base in a disconnected state to prevent the supply of power to the electric system. The service disconnect assembly may additionally include a lockout plug connected to the service disconnect base when the service disconnect plug is in the disconnected state to prevent the service disconnect plug from inadvertently being moved into the connected state.

In another configuration, a method is provided and may include moving a first latch mechanism associated with a service disconnect plug from a latched state to an unlatched state, removing the service disconnect plug from engagement with a service disconnect base, and inserting a lockout plug into the service disconnect base. The method may additionally include moving a second latch mechanism associated with the lockout plug from an unlatched state to a latched state to secure the lockout plug to the service disconnect base. A locking mechanism associated with the lockout plug may then be moved from an unlocked state to a locked state to prevent inadvertent movement of the second latch mechanism from the latched state to the unlatched state.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 4:
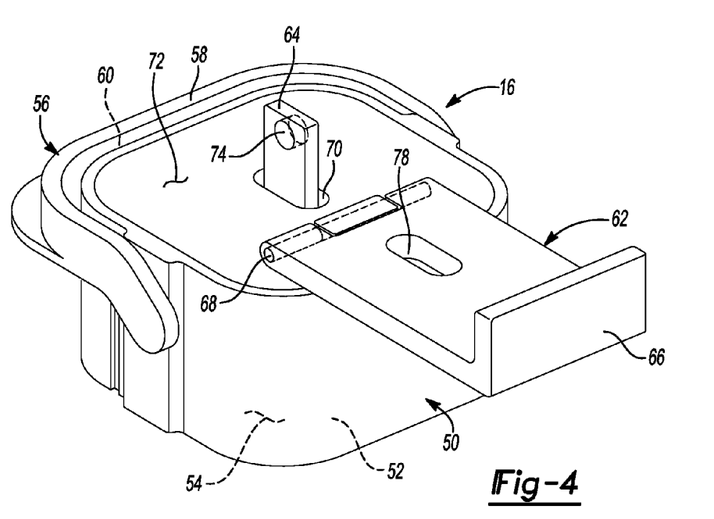
FIG. 4 is a perspective view of a portion of the service disconnect assembly of FIG. 1 showing a latch mechanism in a latched state and a locking mechanism in an unlocked state.
Figure 5:
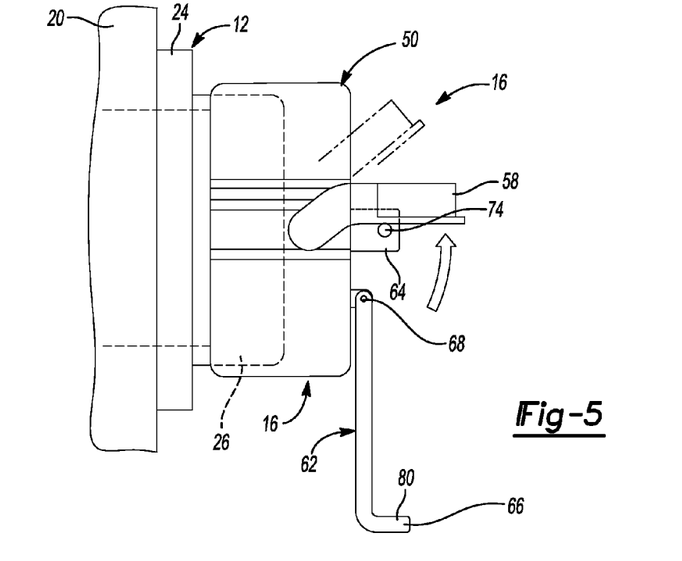
FIG. 5 is a side view of the service disconnect assembly of FIG. 1 in a connected state, showing a latch mechanism in an unlatched state and a locking mechanism in an unlocked state.

With reference to the figures, a service disconnect assembly 10 is provided and may include a service disconnect base 12 and a service disconnect plug 14. The service disconnect assembly 10 may additionally include a lockout plug 16 (FIGS. 4 and 5) that may be selectively used in place of the service disconnect plug 14 when the service disconnect plug 14 is disconnected from the service disconnect base 12.

Figure 1:
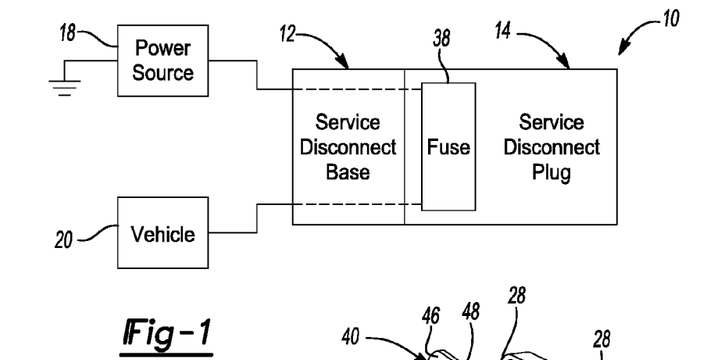
FIG. 1 is a schematic representation of a service disconnect assembly in accordance with the principles of the present disclosure used in conjunction with a power source in a vehicle.

The service disconnect assembly 10 may be used in conjunction with an electric system that supplies power from a power source to a load. For example, the service disconnect assembly 10 may be used in an electric system that supplies power from a power source 18 to an electric or hybrid-electric vehicle 20 (FIG. 1). The service disconnect assembly 10 may be disposed between the power source 18 and the vehicle 20 such that power from the power source 18 passes through the service disconnect assembly 10 prior to reaching the vehicle 20. While the service disconnect assembly 10 will be described and shown hereinafter as being associated with a vehicle 20, the service disconnect assembly 10 could be used in conjunction with any electric system. Namely, the service disconnect assembly 10 may be disposed between a power source and a load of virtually any electric system to selectively interrupt power from the power source to the load.

The service disconnect base 12 may include a housing 22 having a base 24 and a receptacle 26 extending generally from the base 24. The base 24 may include a series of attachment features 28 that allow the housing 22 to be attached to the vehicle 20 via a series of fasteners (none shown). The receptacle 26 may include a substantially square shape having an opening 30 and one or more projections 32 extending from an outer surface 34. An electrical contact (not shown) may be disposed within the opening 30 of the receptacle 26 and may be in electrical communication with the power source 18.

The service disconnect plug 14 may be selectively attached to the service disconnect base 12 to allow current to flow from the power source 18 to the vehicle 20 via the service disconnect plug 14. The service disconnect plug 14 may include a housing 36, a fuse 38 disposed generally within the housing 36 (FIG. 1), and a latch mechanism 40 that may be used to selectively secure the service disconnect plug 14 to the service disconnect base 12. The housing 36 may include a receptacle 42 that receives the receptacle 26 of the housing 22 therein when the service disconnect plug 14 is attached to the service disconnect base 12. Specifically, the receptacle 26 of the housing 22 may be inserted into the receptacle 42 of the housing 36 such that the outer surface 34 of the receptacle 26 opposes an inner surface 44 of the receptacle 42.

The fuse 38 may be disposed within the receptacle 42 such that when the service disconnect plug 14 is attached to the service disconnect base 12, the fuse 38 is placed in electrical communication with the electrical contact of the service disconnect base 12. Providing the fuse 38 in electrical communication with the electrical contact of the service disconnect base 12 allows current to flow from the power source 18 to the vehicle 20 via the fuse 38, as shown in FIG. 1. Accordingly, when the service disconnect plug 14 is attached to the service disconnect base 12 such that the service disconnect plug 14 is in a connected state, current is permitted to flow from the power source 18 to the vehicle 20 via the service disconnect plug 14. Conversely, when the service disconnect plug 14 is in a disconnected state such that the service disconnect plug 14 is removed from the service disconnect base 12 (FIG. 3), current from the power source 18 is not permitted to flow to the vehicle 20. In short, the service disconnect plug 14 must be placed in the connected state (FIGS. 1 and 2) to permit current to flow from the power source 18 to the vehicle 20.

Figure 2:
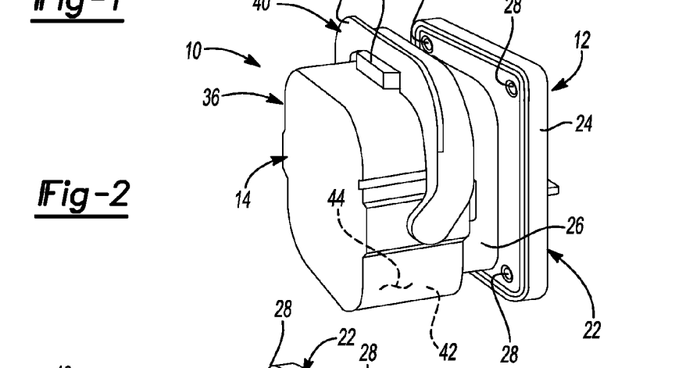
FIG. 2 is a perspective view of the service disconnect assembly of FIG. 1 in a connected state.
Figure 3:
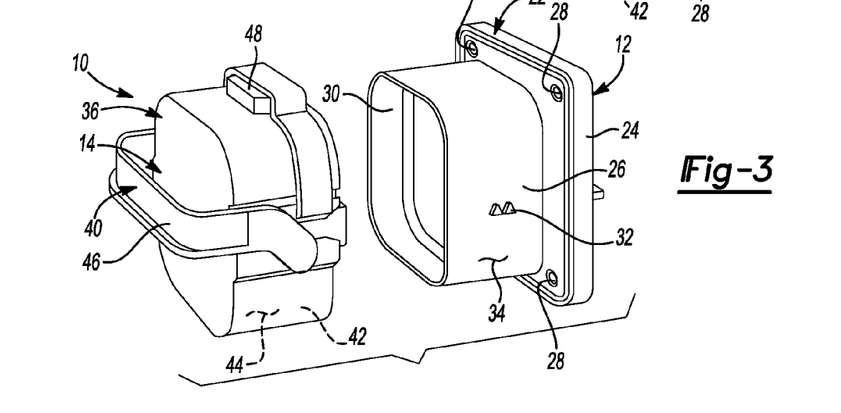
FIG. 3 is a perspective view of the service disconnect assembly of FIG. 1 in a disconnected state.

The latch mechanism 40 may be pivotably attached to the housing 36 of the service disconnect plug 14 and may be moved between a latched state (FIG. 2) and an unlatched state (FIG. 3). The latch mechanism 40 may include a locking arm 46 movable between a latched state (FIG. 2) and an unlatched state (FIG. 3). The locking arm 46 may be moved between the latched state and the unlatched state by depressing an actuation member 48 that permits the latch mechanism 40 to be released and moved from the latched state to the unlatched state.

With particular reference to FIGS. 1-3, operation of the service disconnect assembly 10 will be described in detail. When the service disconnect plug 14 is attached to the service disconnect base 12, current may flow from the power source 18 to the vehicle 20 via the service disconnect plug 14. When the vehicle 20 requires service, however, the service disconnect plug 14 may be removed from the service disconnect base 12 to prevent current from flowing from the power source 18 to the vehicle 20 to allow the vehicle 20 to be serviced. The service disconnect plug 14 may be removed from the service disconnect base 12 by depressing the actuation member 48 to allow the locking arm 46 to be rotated from the latched state (FIG. 2) to the unlatched state (FIG. 3). The actuation member 48 may be depressed a second time to permit the latch mechanism 40 to fully disengage the projections 32 to allow the service disconnect plug 14 to be removed from the service disconnect base 12. Once the service disconnect plug 14 is removed from the service disconnect base 12, current is no longer permitted to flow from the power source 18 to the vehicle 20.

Current from the power source 18 may be supplied to the vehicle 20 once service to the vehicle 20 is complete by connecting the service disconnect plug 14 to the service disconnect base 12. Specifically, the service disconnect plug 14 may be positioned relative to the service disconnect base 12 such that the receptacle 26 of the service disconnect base 12 is received within the receptacle 42 of the service disconnect plug 14. Once the receptacle 26 of the service disconnect base 12 is sufficiently inserted into the receptacle 42 of the service disconnect plug 14, the fuse 38 associated with the service disconnect plug 14 is placed in electrical communication with the contacts or terminals of the service disconnect base 12. At this point, current is permitted to flow from the power source 18 to the vehicle 20 via the fuse 38 of the service disconnect plug 14.

The latch mechanism 40 may be moved from the unlatched state (FIG. 3) to the latched state (FIG. 2) to secure the service disconnect plug 14 to the service disconnect base 12 in an effort to ensure power is consistently and continually supplied to the vehicle 20 from the power source 18. Specifically, the locking arm 46 may be rotated from the position shown in FIG. 3 to the position shown in FIG. 2 to allow the latch mechanism 40 to engage the projections 32 of the service disconnect base 12, thereby placing the latch mechanism 40 in the latched state and maintaining the service disconnect plug 14 in the connected state. The service disconnect plug 14 remains in the connected state such that the service disconnect plug 14 is in electrical communication with the service disconnect base 12 until the latch mechanism 40 is moved from the latched state to the unlatched state.

As described above, when the service disconnect plug 14 is disconnected from the service disconnect base 12, current from the power source 18 is not permitted to flow to the vehicle 20. However, should the service disconnect plug 14 be moved from the disconnected state to the connected state, such that the service disconnect plug 14 is attached to the service disconnect base 12, current is once again permitted to flow from the power source 18 to the vehicle 20. The lockout plug 16 may be used in place of the service disconnect plug 14 when the vehicle 20 is being serviced to ensure that the service disconnect plug 14 is not inadvertently connected to the service disconnect base 12.

The lockout plug 16 may include a housing 50 that is substantially identical to the housing 36 of the service disconnect plug 14 to allow the housing 50 to be attached to the service disconnect base 12 in a similar fashion as the service disconnect plug 14. Accordingly, the housing 50 may include a receptacle 52 having an inner surface 54 that opposes the outer surface 34 of the service disconnect base 12 when the lockout plug 16 is attached to the service disconnect base 12. The receptacle 52 may be virtually identical to the receptacle 42 of the service disconnect plug 14 such that when the lockout plug 16 is attached to the service disconnect base 12, the receptacle 26 of the service disconnect base 12 is received within the receptacle 52 of the lockout plug 16.

The lockout plug 16 may also include a latch mechanism 56 having a locking arm 58 and an actuation member 60. The latch mechanism 56 may be virtually identical to the latch mechanism 40 and may be moved from a latched state (FIG. 4) to an unlatched state (FIG. 5) by depressing the actuation member 60 and rotating the locking arm 58 in the same fashion, as described above with respect to the latch mechanism 40.

The lockout plug 16 may include a locking mechanism 62 having a locking post 64 and a lockout arm 66. The lockout arm 66 may be pivotably attached to the housing 50 at a pivot 68 while the locking post 64 may be fixedly attached to the housing 50 and may extend through an aperture 70 formed through a top surface 72 of the housing 50.

The locking post 64 may extend from the top surface 72 of the housing 50 and may include an aperture 74. The aperture 74 may selectively receive a lock 76 (FIG. 7) such as a padlock or a combination lock when the locking mechanism 62 is in the locked state, as will be described in greater detail below.

With continued reference to FIGS. 4-7, operation of the lockout plug 16 will be described in detail. When the service disconnect plug 14 is in the disconnected state such that the service disconnect plug 14 is disconnected and removed from the service disconnect base 12, the lockout plug 16 may be attached to the service disconnect base 12 to prevent current from flowing from the power source 18 to the vehicle 20. The lockout plug 16 does not include a fuse such as the fuse 38 associated with the service disconnect plug 14 and, as such, when the lockout plug 16 is attached to the service disconnect base 12, current is not permitted to flow from the power source 18 to the vehicle 20 via the lockout plug 16 or otherwise.

The lockout plug 16 may be attached to the service disconnect base 12 by inserting the receptacle 26 of the service disconnect base 12 into the receptacle 52 of the lockout plug 16 until the projections 32 of the service disconnect base 12 are properly positioned relative to the latch mechanism 56. At this point, the latch mechanism 56 may be moved from the unlatched state (FIG. 5) to the latched state (FIGS. 6 and 7) to allow the latch mechanism 56 to properly engage the projections 32, thereby preventing inadvertent removal of the lockout plug 16 from the service disconnect base 12.

Figure 6:
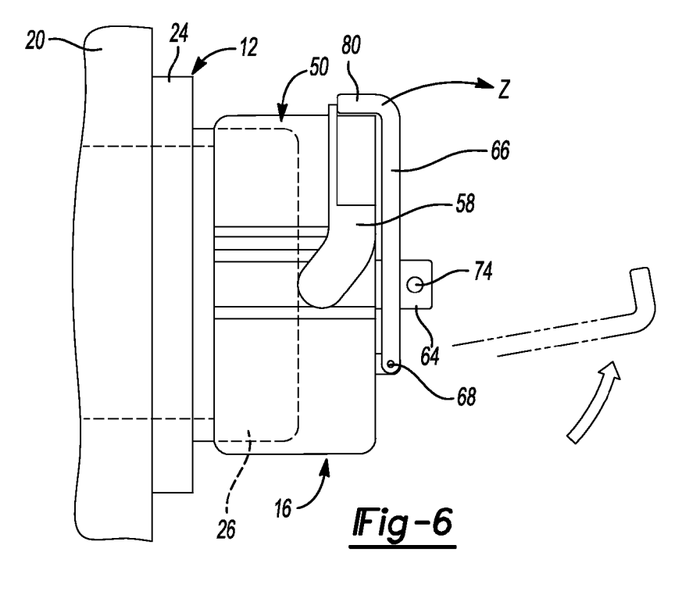
FIG. 6 is a side view of the service disconnect assembly of FIG. 1 in a connected state, showing a latch mechanism in a latched state and a locking mechanism in an unlocked state.
Figure 7:
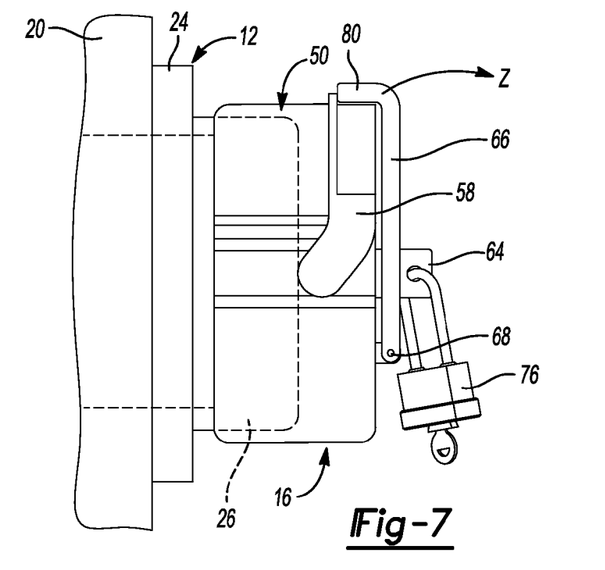
FIG. 7 is a side view of the service disconnect assembly of FIG. 1 in a connected state, showing a latch mechanism in a latched state and a locking mechanism in a locked state.

While the latch mechanism 56 adequately prevents removal of the lockout plug 16 from the service disconnect base 12, the locking mechanism 62 may also be used to ensure that the lockout plug 16 remains connected to the service disconnect base 12. Namely, once the latch mechanism 56 is in the latched state and the lockout plug 16 is properly attached to the service disconnect base 12, the lockout arm 66 may be rotated relative to the housing 50 about the pivot 68 until an aperture 78 (FIG. 4) of the lockout arm 66 receives the locking post 64 (FIG. 6). At this point, the lockout arm 66 is positioned relative to the locking post 64 such that the lockout arm 66 is disposed generally between the aperture 74 of the locking post 64 and the top surface 72 of the housing 50. Further, when the lockout arm 66 is in the locked state (FIG. 6), an arm 80 of the lockout arm 66 may be in contact with or in close proximity to the locking arm 58 of the latch mechanism 56, as shown in FIGS. 6 and 7.

The lockout arm 66 may be maintained in the locked position by inserting the lock 76 through the aperture 74 of the locking post 64. Inserting the lock 76 through the aperture 74 of the locking post 64 prevents the lockout arm 66 from being rotated in the (Z) direction (FIGS. 6 and 7) more than a predetermined amount. In so doing, the lockout arm 66 likewise prevents rotation of the locking arm 58 of the latch mechanism 56 in the (Z) direction relative to the housing 50, which prevents the latch mechanism 56 from moving from the latched state to the unlatched state. Preventing the latch mechanism 56 from moving from the latched state to the unlatched state likewise prevents the lockout plug 16 from being removed from the service disconnect base 12 and, therefore, ensures that current from the power source 18 is not permitted to flow to the vehicle 20.

The lockout plug 16 may be removed from the service disconnect base 12 when the lock 76 is removed from the aperture 74 of the locking post 64. Once the lock 76 is removed from the locking post 64, the lockout arm 66 may be rotated in the (Z) direction until the lockout arm 66 is removed from the locking post 64. At this point, the latch mechanism 56 may be removed from the latched state (FIGS. 6 and 7) to the unlatched state (FIG. 5) such that the latch mechanism 56 disengages the projections 32 of the service disconnect base 12. A force may then be applied to the lockout plug 16 to remove the lockout plug 16 from the service disconnect base 12 to allow the service disconnect plug 14 to once again be attached to the service disconnect base 12, thereby allowing the power source 18 to supply power to the vehicle 20 via the service disconnect plug 14.

Providing the lockout plug 16 with the locking mechanism 62 allows a service technician to use a user-specific lock 76. Namely, the service technician may use a combination lock having an unlock combination that is only known by the service technician or allows the service technician to use a padlock having a single key held only by the service technician. Use of a user-specific lock 76 allows the service technician to be the only person capable of removing the lock 76 and, thus, removing the lockout plug 16 from the service disconnect base 12.

As described above, the service disconnect plug 14 and the lockout plug 16 each include a latch mechanism 40, 56, respectively, that incorporate an actuation member 48, 60, that must be depressed to move the latch mechanism 40, 56, from a latched state to an unlatched state. The locking mechanism 62 works in conjunction with the latch mechanism 56 of the lockout plug 16 to prevent removal of the lockout plug 16 from the service disconnect base 12 when the locking mechanism 62 is in the locked state. While the locking mechanism 62 is shown and described as being used in conjunction with a lockout plug 16 having a latch mechanism 40 with a depressible actuation member 48, the locking mechanism 62 could alternatively be used in conjunction with a lockout plug having a latch mechanism that is free from such a depressible actuation member. In short, the locking mechanism 62 could be used in conjunction with virtually any latch mechanism by allowing the locking mechanism 62 to selectively engage the latch mechanism to prevent movement of the latch mechanism relative to the housing 50.

With particular reference to FIGS. 8-12, a service disconnect assembly 110 is shown incorporating a service disconnect base 112 and a lockout plug 114. The service disconnect base 112 may be attached to a power source and a vehicle in a similar fashion as the service disconnect base 12. Further, the service disconnect base 112 may receive a service disconnect plug (not shown) in a similar fashion as the service disconnect base 12 receives the service disconnect plug 14 to permit current to flow from a power source to a vehicle.

The lockout plug 114 may be received by a receptacle 116 of the service disconnect base 112 when the service disconnect plug is removed from the service disconnect base 112 to prevent the service disconnect plug from being inadvertently inserted into the service disconnect base 112. The lockout plug 114 may include a latch mechanism 118 having a locking arm 120. The locking arm 120 may be slideably attached to a main body 122 of the lockout plug 114 via interaction between a post 124 associated with the main body 122 and a slot 126 associated with the locking arm 120. Specifically, the locking arm 120 may be moved from a latched state (FIG. 9) to an unlatched state (FIG. 8) by applying a force on the locking arm 120 in the (Y) direction (FIG. 9) until the post 124 encounters an angled, distal end 128 of the slot 126. When the post 124 encounters the distal end 128 of the slot 126, the locking arm 120 is permitted to move in the (X) direction (FIG. 8) relative to the main body 122. Sufficient movement of the locking arm 120 in the (X) direction relative to the main body 122 positions the latch mechanism 118 in the unlatched state and allows the lockout plug 114 to be removed from the service disconnect base 112.

As with the lockout plug 16, the lockout plug 114 may be inserted into the service disconnect base 112 when the service disconnect plug is removed from the service disconnect base 112 to prevent the flow of current from the power source to the vehicle. The lockout plug 114 may initially be positioned relative to the service disconnect base 112 such that a portion of the main body 122 is received within the receptacle 116 of the service disconnect base 112. At this point, the latch mechanism 118 is in the unlatched state (FIG. 8) and the post 124 is disposed proximate to the distal end 128 of the slot 126. A force may be applied to the locking arm 120 to move the locking arm 120 relative to the post 124 such that the post 124 traverses the slot 126 and is moved into the position shown in FIG. 9. In this position, the latch mechanism 118 is in the latched state and the lockout plug 114 is fixed for movement with the service disconnect base 112. The lockout plug 114 remains in the latched state until a force is once again applied on the locking arm 120 in the (Y) direction and is pivoted relative to the main body 122 in the (X) direction.

Inadvertent removal of the lockout plug 114 from the service disconnect base 112 may be prevented by incorporating a locking mechanism 130 into the lockout plug 114. The locking mechanism 130 may include a locking arm 132 that is pivotably supported relative to the main body 122 and a locking post 134 that is fixed for movement with the main body 122. As with the locking mechanism 62, the locking arm 132 may be positioned relative to the locking arm 120 of the latch mechanism 118 to prevent movement of the locking arm 120 from the latched state to the unlatched state.

Figure 8:
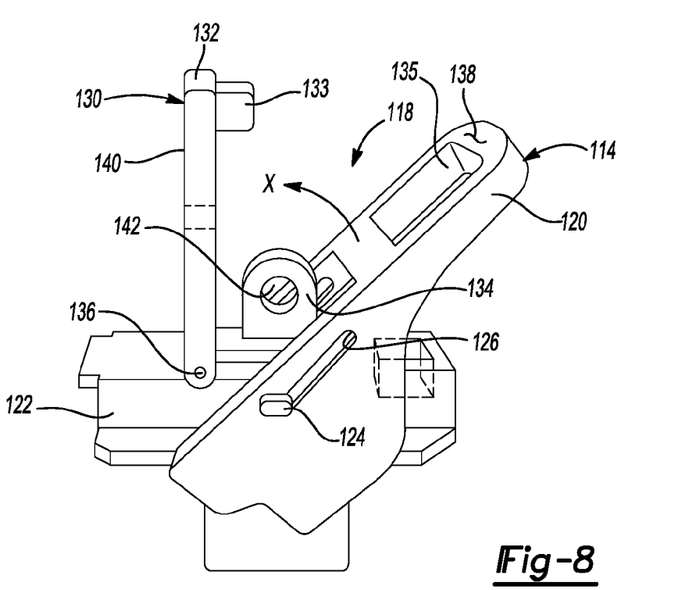
FIG. 8 is a perspective view of a lockout plug in accordance with the principles of the present disclosure for use with a service disconnect assembly.
Figure 9:
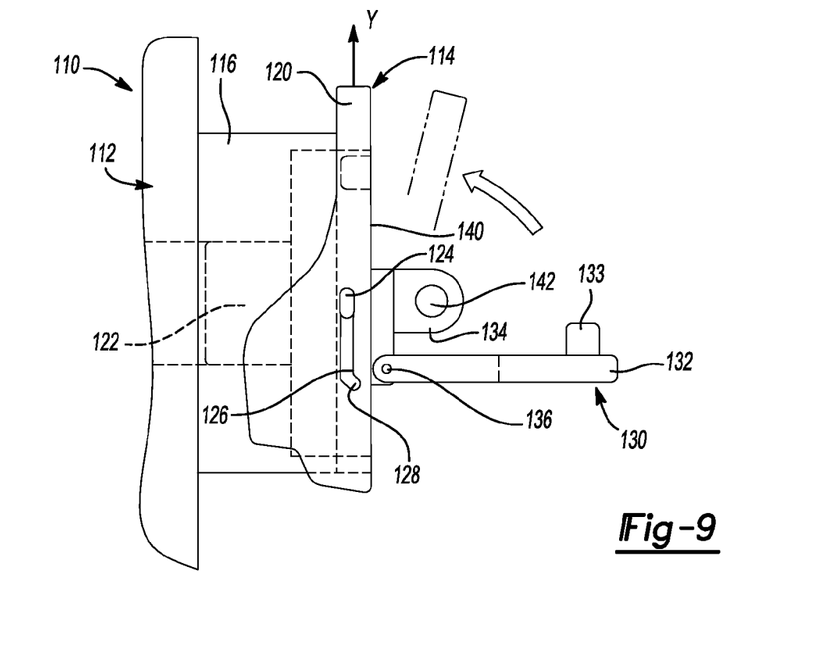
FIG. 9 is a side view of a service disconnect assembly in accordance with the principles of the present disclosure incorporating the lockout plug of FIG. 8 in a connected state.
Figure 10:
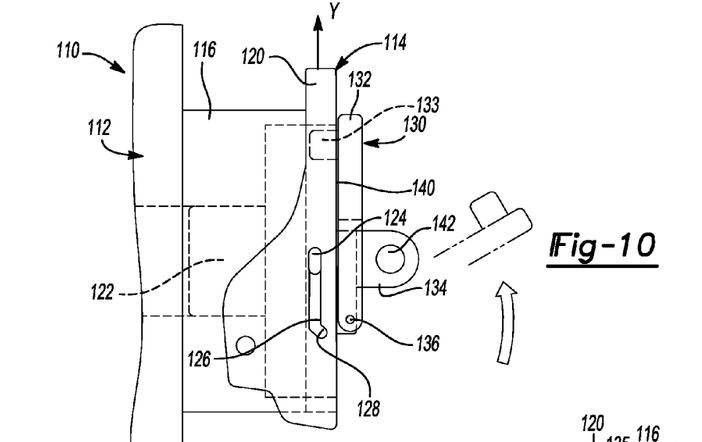
FIG. 10 is a side view of the service disconnect assembly of FIG. 9 in a connected state showing a latch mechanism in a latched state and a locking mechanism in an unlocked state.
Figure 11:
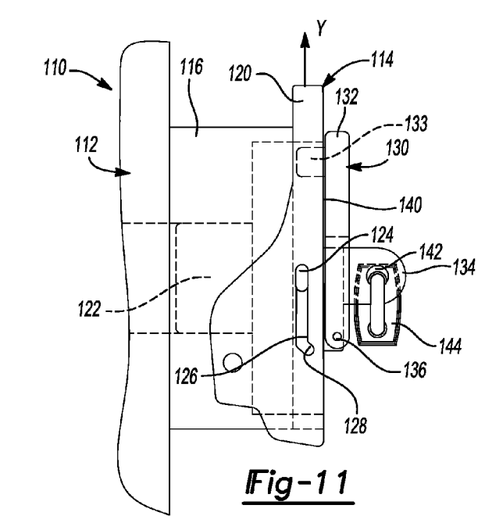
FIG. 11 is a side view of the service disconnect assembly of FIG. 9 in a connected state showing a latch mechanism in a latched state and a locking mechanism in a locked state.
Figure 12:
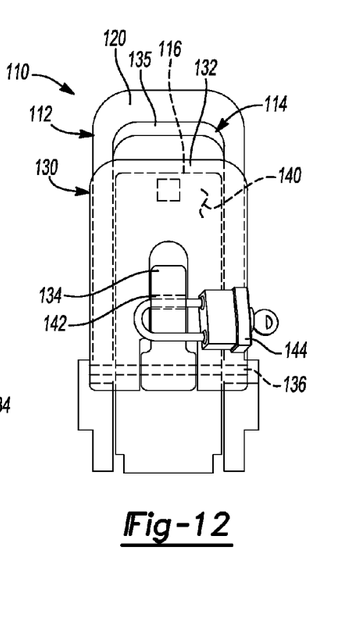
FIG. 12 is a top view of the service disconnect assembly of FIG. 9 in a connected state showing a latch mechanism in a latched state and a locking mechanism in a locked state.

In operation, when the lockout plug 114 is received in the receptacle 116 of the service disconnect base 112, the locking arm 120 may be moved from the unlatched state (FIG. 8) to the latched state (FIG. 9). At this point, the locking mechanism 130 may be moved into a locked state by pivoting the locking arm 132 about a pivot 136 until the locking arm 132 abuts or is in close proximity to an outer surface 138 (FIG. 8) of the locking arm 132. When the locking arm 132 is positioned in close proximity to the outer surface 138, the locking post 134 may extend from a top surface 140 of the locking arm 132 such that an aperture 142 of the locking post 134 extends above the top surface 140 of the locking arm 132. Further, the locking arm 132 may include a projection 133 that is received within an aperture 135 of the locking arm 120 to restrict movement of the locking arm 120 in a direction substantially opposite to the (Y) direction. Preventing such movement of the locking arm 120 prevents the post 124 from reaching the distal end 128 of the slot 126, which likewise prevents the locking arm 120 from moving into the unlatched state.

When the locking arm 132 is positioned in the locked state (FIGS. 10-12), a lock 144 may be inserted into the aperture 142 of the locking post 134 to restrict movement of the locking arm 132 relative to the main body 122. As with the lock 76, the lock 144 may be a combination lock or a padlock that cooperates with the locking arm 132 to restrict movement of the locking arm 120 relative to the main body 122 when received in the aperture 142 of the locking post 134 by physically engaging the locking arm 120. Restricting movement of the locking arm 132 of the locking mechanism 130 likewise prevents movement of the locking arm 120 of the latch mechanism 118 from moving from the latched state (FIG. 9) to the unlatched state (FIG. 8). Therefore, when the lockout plug 114 is attached to the service disconnect base 112 and the latch mechanism 118 is in the latched state and the locking mechanism 130 is in the locked state, the lockout plug 114 remains attached to the service disconnect base 112 until the lock 144 is removed from the locking post 134 and the locking arm 132 is sufficiently moved away from the locking arm 120 of the latch mechanism 118.

Figure 13:
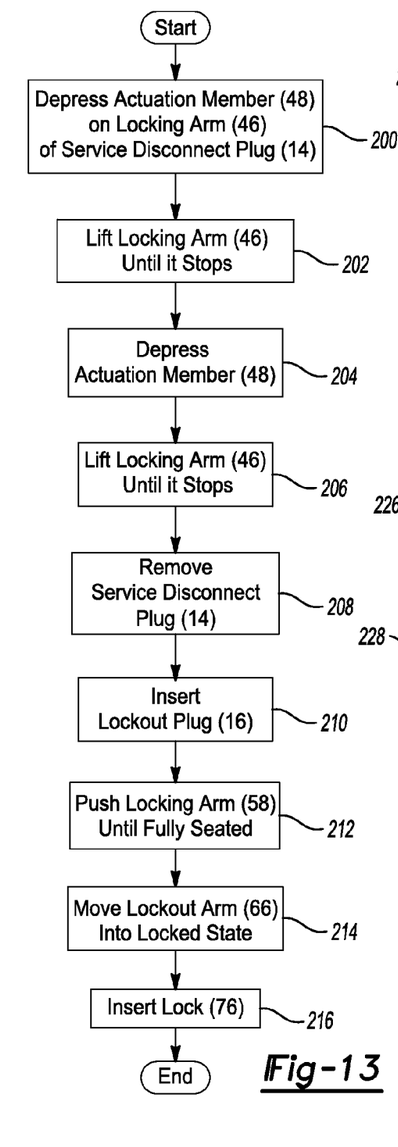
FIG. 13 is a flowchart detailing operation of a service disconnect assembly in accordance with the principles of the present disclosure.
Figure 14:
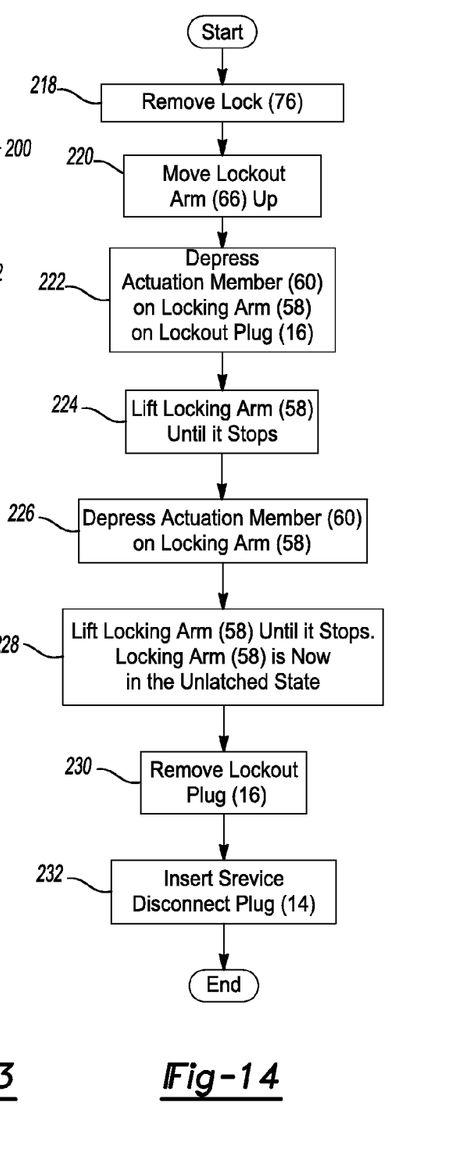
FIG. 14 is a flowchart detailing operation of a service disconnect assembly in accordance with the principles of the present disclosure.

With particular reference to FIGS. 13 and 14, operation of the service disconnect assembly 10 will be described in detail. While the following description is made with respect to the service disconnect assembly 10, a similar procedure may be used in connection with the service disconnect assembly 110 when the service disconnect plug is removed from the service disconnect base 112 and the lockout plug 114 is attached to the service disconnect base 112.

In operation, current is permitted to flow from the power source 18 to the vehicle 20 when the service disconnect plug 14 is attached to the service disconnect base 12 via the fuse 38 of the service disconnect plug 14, as described above. When the vehicle 20 requires service, the service disconnect plug 14 may be removed from the service disconnect base 12 to prevent the power source 18 from supplying power to the vehicle 20.

Initially, a force may be applied to the actuation member 48 of the latch mechanism 40 at 200. The locking arm 46 may then be rotated relative to the housing 36 until the locking arm 46 stops at 202. At this point, the actuation member 48 may be depressed once again at 204 and the locking arm 46 may be fully rotated into the unlatched state at 206.

The service disconnect plug 14 may then be removed at 208 and the lockout plug 16 may be inserted into the service disconnect base 12 at 210. The locking arm 58 of the lockout plug 16 may then be rotated relative to the housing 50 until the locking arm 58 is fully seated at 212. At this point, the lockout arm 66 may be rotated relative to the housing 50 about the pivot 68 at 214 and the lock 76 may be inserted into the aperture 74 of the locking post 64 at 216. At this point, the lockout plug 16 is attached to the service disconnect base 12 and cannot be removed until the lock 76 is removed from the locking post 64 and the lockout arm 66 is rotated sufficiently away from the locking arm 58 of the latch mechanism 56 to allow the latch mechanism 56 to be moved to the unlatched state.

The lockout plug 16 may be removed from the service disconnect base 12 by removing the lock 76 from the aperture 74 of the locking post 64 at 218 (FIG. 14). At this point, the lockout arm 66 may be rotated relative to the housing 50 in a direction generally away from the locking arm 58 at 220. Once the lockout arm 66 is moved to the unlocked state, a force may be applied to the actuation member 60 of the latch mechanism 56 at 222 and the locking arm 58 may be rotated into the unlatched state (FIG. 5) at 224. A force may again be applied to the actuation member 60 at 226 and the locking arm 58 may be moved into the unlatched state at 228. At this point, the latch mechanism 56 is in the unlatched state and the lockout plug 16 may be removed from the service disconnect base 12 at 230. Once the lockout plug 16 is removed from the service disconnect base 12, the service disconnect plug 14 may be inserted into the service disconnect base 12 at 232 and the latch mechanism 40 may be moved to the latched state. At this point, the power source 18 is permitted to supply power to the vehicle 20 via the fuse 38 of the service disconnect plug 14.

What is claimed is:

1. A method comprising:
   moving a first latch mechanism associated with a service disconnect plug from a latched state to an unlatched state;
   removing said service disconnect plug from engagement with a service disconnect base;
   inserting a lockout plug into said service disconnect base;
   moving a second latch mechanism associated with said lockout plug from an unlatched state to a latched state to secure said lockout plug to said service disconnect base; and
   moving a locking mechanism associated with said lockout plug from an unlocked state to a locked state to prevent inadvertent movement of said second latch mechanism from said latched state to said unlatched state wherein preventing movement of said second latch mechanism from said latched state to said unlatched state includes moving one of a combination lock or a pad lock into a locked state to restrict movement of said second latch mechanism relative to said service disconnect base.

2. A method comprising:
   moving a first latch mechanism associated with a service disconnect plug from a latched state to an unlatched state;
   removing said service disconnect plug from engagement with a service disconnect base;
   inserting a lockout plug into said service disconnect base;
   moving a second latch mechanism associated with said lockout plug from an unlatched state to a latched state to secure said lockout plug to said service disconnect base; and
   moving a locking mechanism associated with said lockout plug from an unlocked state to a locked state to prevent inadvertent movement of said second latch mechanism from said latched state to said unlatched state wherein preventing movement of said second latch mechanism from said latched state to said unlatched state includes moving a locking arm toward said second latch mechanism to restrict movement of said second latch mechanism relative to said service disconnect base.

3. The method of claim 2, wherein restricting movement of said second latch mechanism relative to said service disconnect base from said latched state to said unlatched state prevents removal of said lockout plug from said service disconnect base.

4. The method of claim 2, wherein preventing movement of said second latch mechanism from said latched state to said unlatched state includes moving one of a combination lock or a pad lock into a locked state to restrict movement of said locking arm relative to said service disconnect base.

5. A service disconnect assembly for an electric system, the electric system having a power source and a load, the service disconnect assembly comprising:
   a service disconnect base electrically connected to the electric system;
   a service disconnect plug operable to be connected to said service disconnect base in a connected state to supply the load of the electric system with power from the power source via said service disconnect plug and operable to be disconnected from said service disconnect base in a disconnected state to prevent the supply of power from the power source to the load of the electric system; and
   a lockout plug operable to be connected to said service disconnect base when said service disconnect plug is in said disconnected state to prevent said service disconnect plug from inadvertently being moved into said connected state;
   wherein said service disconnect plug includes a first latch mechanism operable in a latched state to secure said service disconnect plug to said service disconnect base when said service disconnect plug is in said connected state and said lockout plug includes a second latch mechanism operable in a latched state to secure said lockout plug to said service disconnect base when said lockout plug is connected to said service disconnect base;
   wherein said lockout plug includes a locking mechanism operable in a locked state to restrict movement of said second latch mechanism relative to said service disconnect base to prevent inadvertent removal of said lockout plug from said service disconnect base; and
   wherein said locking mechanism includes a locking arm in selective engagement with said second latch mechanism to prevent movement of said second latch mechanism from said latched state to an unlatched state.

6. The service disconnect assembly of claim 5, wherein said first latch mechanism and said second latch mechanism are substantially identical.

7. The service disconnect assembly of claim 5, wherein said locking mechanism contacts said second latch mechanism to prevent movement of said second latch mechanism from said latched state to an unlatched state.

8. The service disconnect assembly of claim 5, wherein said locking mechanism includes one of a combination lock or a pad lock in selective engagement with said locking arm to restrict movement of said locking arm relative to said service disconnect base.

9. The service disconnect assembly of claim 5, wherein the electric system is an electric system for an electric vehicle.

10. The service disconnect assembly of claim 9, wherein the load of the electric system includes an electric motor of the electric vehicle and said service disconnect plug includes a fuse operable to permit current to flow from said power source to the electric motor of said electric vehicle when said service disconnect plug is in said connected state.

11. The service disconnect assembly of claim 5, wherein said service disconnect plug includes a first housing matingly received by said service disconnect base when said service disconnect plug is in said connected state and said lockout plug includes a second housing matingly received by said service disconnect base when said lockout plug is connected to said service disconnect base.

12. The service disconnect assembly of claim 11, wherein said first housing and said second housing are substantially identical to allow said first housing and said second housing to be interchangeably attached to said service disconnect base.

13. A service disconnect assembly for an electric system, the electric system having a power source and a load, the service disconnect assembly comprising:
- a service disconnect base electrically connected to the electric system;
- a service disconnect plug operable to be connected to said service disconnect base in a connected state to supply the load of the electric system with power from the power source via said service disconnect plug and operable to be disconnected from said service disconnect base in a disconnected state to prevent the supply of power from the power source to the load of the electric system; and
- a lockout plug operable to be connected to said service disconnect base when said service disconnect plug is in said disconnected state to prevent said service disconnect plug from inadvertently being moved into said connected state;
- wherein said lockout plug includes a latch mechanism operable in a latched state to secure said lockout plug to said service disconnect base when said lockout plug is connected to said service disconnect base;
- wherein said lockout plug includes a locking mechanism operable in a locked state to restrict movement of said latch mechanism relative to said service disconnect base to prevent inadvertent removal of said lockout plug from said service disconnect base; and
- said locking mechanism includes a locking arm in selective engagement with said latch mechanism to prevent movement of said latch mechanism from said latched state to an unlatched state.

14. The service disconnect assembly of claim 13, wherein said locking mechanism contacts said latch mechanism to prevent movement of said latch mechanism from said latched state to an unlatched state.

15. The service disconnect assembly of claim 13, wherein said locking mechanism includes one of a combination lock or a pad lock in selective engagement with said locking arm to restrict movement of said locking arm relative to said service disconnect base.

16. The service disconnect assembly of claim 13, wherein the electric system is an electric system for an electric vehicle.

17. The service disconnect assembly of claim 16, wherein the load of the electric system includes an electric motor of the electric vehicle and said service disconnect plug includes a fuse operable to permit current to flow from said power source to the electric motor of said electric vehicle when said service disconnect plug is in said connected state.

18. The service disconnect assembly of claim 13, wherein said service disconnect plug includes a first housing matingly received by said service disconnect base when said service disconnect plug is in said connected state and said lockout plug includes a second housing matingly received by said service disconnect base when said lockout plug is connected to said service disconnect base.

19. The service disconnect assembly of claim 18, wherein said first housing and said second housing are substantially identical to allow said first housing and said second housing to be interchangeably attached to said service disconnect base.

* * * * *